(12) United States Patent
Oro et al.

(10) Patent No.: US 9,582,494 B2
(45) Date of Patent: Feb. 28, 2017

(54) OBJECT EXTRACTION FROM PRESENTATION-ORIENTED DOCUMENTS USING A SEMANTIC AND SPATIAL APPROACH

(71) Applicant: ALTILIA s.r.l., Rende (CS) (IT)

(72) Inventors: Ermelinda Oro, Cosenza (IT); Massimo Ruffolo, Cosenza (IT)

(73) Assignee: Altilia s.r.l., Rende (CS) (IT)

( * ) Notice: Subject to any disclaimer, the term of this patent is extended or adjusted under 35 U.S.C. 154(b) by 772 days.

(21) Appl. No.: 13/774,289

(22) Filed: Feb. 22, 2013

(65) Prior Publication Data

US 2014/0245122 A1 Aug. 28, 2014

(51) Int. Cl.
*G06F 17/00* (2006.01)
*G06F 17/27* (2006.01)

(52) U.S. Cl.
CPC .................. *G06F 17/2785* (2013.01)

(58) Field of Classification Search
CPC ..................... G06F 17/2785; G06F 17/241
See application file for complete search history.

(56) References Cited

U.S. PATENT DOCUMENTS

| 6,606,625 B1 | 8/2003 | Muslea et al. |
| 6,738,767 B1 | 5/2004 | Chung et al. |
| 7,007,017 B2 | 2/2006 | Bergholz et al. |
| 7,249,135 B2 | 7/2007 | Ma et al. |
| 7,454,430 B1 | 11/2008 | Komissarchik et al. |
| 7,552,116 B2 | 6/2009 | Chang et al. |

(Continued)

FOREIGN PATENT DOCUMENTS

CN 101667201 3/2010

OTHER PUBLICATIONS

Crescenzi, Valter et al., "RoadRunner: Towards Automatic Data Extraction from Large Web Sites," Proceedings of the 27th VLDB Conference, Rome, Italy, 2001.

(Continued)

*Primary Examiner* — Scott Baderman
*Assistant Examiner* — Matthew G McVicker
(74) *Attorney, Agent, or Firm* — Convergent Law Group LLP

(57) ABSTRACT

Automatic extraction of objects in a presentation-oriented document comprises receiving the presentation-oriented document (POD) in which content elements are spatially arranged in a given layout organization for presenting contents to human users; receiving a set of descriptors that semantically define the objects to extract from the POD based on attributes comprising the objects; using the set of descriptors to identify content elements in the POD that match the attributes in the set of descriptors defining the objects, and assigning semantic annotations to the identified elements based on the descriptors; creating a semantic and spatial document model (SSDM) containing spatial structures of the identified content elements in the POD and the semantic annotations assigned to the identified contents elements; extracting the identified content elements from the POD based on the set of descriptors and the SSDM to create a set of object instances; and performing at least one of: i) using the object instances to generate semantic and spatial wrappers that can be reused on a different POD, and ii) storing the object instances in a data repository.

22 Claims, 9 Drawing Sheets

(56) References Cited

U.S. PATENT DOCUMENTS

| | | | |
|---|---|---|---|
| 7,581,170 | B2 | 8/2009 | Baumgartner et al. |
| 7,660,804 | B2 | 2/2010 | Wen et al. |
| 7,873,624 | B2 | 1/2011 | Agichtein et al. |
| 8,103,962 | B2 | 1/2012 | Embley et al. |
| 8,205,153 | B2 | 6/2012 | Chenthamarakshan et al. |
| 2004/0158799 | A1 | 8/2004 | Breuel |
| 2005/0022115 | A1 | 1/2005 | Baumgartner et al. |
| 2005/0055365 | A1 | 3/2005 | Ramakrishnan et al. |
| 2006/0161564 | A1 | 7/2006 | Pierre et al. |
| 2007/0078850 | A1 | 4/2007 | Aziz et al. |
| 2008/0294679 | A1* | 11/2008 | Gatterbauer ...... G06F 17/30861 |
| 2010/0083095 | A1 | 4/2010 | Nikovski et al. |
| 2010/0162097 | A1 | 6/2010 | Dalvi et al. |
| 2010/0169301 | A1 | 7/2010 | Rubanovich et al. |
| 2011/0022941 | A1 | 1/2011 | Osborne |
| 2011/0055285 | A1* | 3/2011 | Chenthamarakshan G06F 17/30864 707/803 |
| 2011/0252313 | A1* | 10/2011 | Tanushree ........... G06F 17/2229 715/255 |
| 2012/0284259 | A1* | 11/2012 | Jehuda ............. G06F 17/30734 707/722 |
| 2012/0310990 | A1 | 12/2012 | Viegas et al. |

OTHER PUBLICATIONS

Liu, Bing et al., "Mining Data Records in Web Pages," Conference '00, Month 1-2, 2000.

Arasu, Arvind et al., "Extracting Structured Data From Web Pages," SIGMOD, San Diego, CA, Jun. 9-13.

Meng, Xiaofeng et al., "A Supervised Visual Wrapper Generator for Web-Data Extraction," Proceedings of the 27th Annual International Computer Software and Applications Conference (COMPSAC '03), 0730-3157/03, 2003.

Cai, Deng et al., "VIPS: A Vision based Page Segmentation algorithm," Microsoft Research Asia, Bejing, China, 2004.

Flesca, Sergio et al, "Schema-Based Web Wrapping," DEIS, University of Calabria, Italy, 2004.

Simon, Kai et al, "ViPER: Augmenting Automatic Information Extraction with Visual Perceptions," CIKM'05, ACM 1-59593-1400, Jun. 2005.

Papadakis, Nikolaos et al, "STAVIES: A System for Information Extraction from Unknown Web Data Sources through Automatic Web Wrapper Generation Using Clustering Techniques," IEEE Transactions on Knowledge and Data Engineering, vol. 17, No. 12, Dec. 2005.

Zhao, Hongkun et al., "Fully Automatic Wrapper Generation for Search Engines," International World Wide Web Conference Committee (IW3C2), May 10-14, 2005, Chiba, Japan.

Zhai, Yanhong et al., "Web Data Extraction Based on Partial Tree Alignment," International World Wide Web Conference Committee (IW3C2), May 10-14, 2005, Chiba, Japan.

Adah, S. et al., "An Algebra for Creating and Querying Multimedia Presentations," Rensselaer Polytechnic Institute.

Gatterbauer, Wolfgang et al., "Towards Domain-Independent Information Extraction from Web Tables," International World Wide Web Conference Committee (IW3C2), May 8-12, 2007, Banff, Alberta, Canada.

Baumgartner, Robert et al., "Scalable Web Data Extraction for Online Market Intelligence," VLDB Endowment, Aug. 24-28, 2009, Lyon, France.

Baumgartner, Robert et al., "The Elog Web Extraction Language," DEIS, University of Calabria, Rende, Italy.

Kong, Jun et al., "Spatial Graph Grammars for Graphical User Interfaces," ACM Transactions on Computer-Human Interaction, vol. 23, No. 2, Jun. 2006.

Sahuguet, Arnaud et al., "Building Intelligent Web Applications Using Lightweight Wrappers," Data and Knowledge Engineering, vol. 36, Issue 3, 2001.

Della Penna, Giuseppe et al., "A general theory of spatial relations to support a graphical tool for visual information extraction," Journal of Visual Languages and Computing, 2013, http://dx.doi.org/10.1016/j.jvlc.2012.11.002.

Baumgartner, Robert et al., "Visual Web Information Extraction with Lixto," Proceedings of VLDB. 2001.

Abdessalem, Talel; Cautis, Bodgan; Derouiche, Nora; "ObjectRunner: Lightweight, Targeted Extraction and Querying of Structured Web Data," Telecom Paris Tech—CNRS LTCI, Paris, France, Proceedings of the VLDB Endowment, vol. 3, No. 2, Sep 2010.

Li, Longzhuang; Liu, Yonghuai; Obregon, Abel; Weatherston, Matt; "Visual Segmentation-Based Data Record Extraction from Web Documents," IEEE Xplore, 1-4244-1500, Apr. 2007.

Liu, Wei; Meng, Xiaofeng; Meng, Weiyi, "ViDE: A Vision-based Approach for Deep Web Data Extraction," Journal of Latex Class Files, vol. 6, No. 1, Jan. 2007.

Oro, Ermelinda; Ruffolo, Massimo, "Description Ontologies," University of Calabria, Rende, Italy. 2012.

Oro, Ermelinda; Ruffolo, Massimo; Staab, Steffen, "SXPath—Extending XPath towards Spatial Querying on Web Documents," Proceedings of the VLDB Endowment, vol. 4, No. 2, Sep 2011.

Oro, Ermelinda; Ruffolo, Massimo, "Xonto: An Ontology-based System for Semantic Information Extraction from Pdf Documents," University of Calabria, Rende, Italy. 2012.

Sasikala, D.; Selva, Kumar G., "Extraction of Deep Web Contents," International Journal of Modern Engineering Research, vol. 2, Issue 1, Jan.-Feb. 2012.

Simon, Kai; Hornung, Thomas; Lausen, Georg, "Learning Rules to Pre-Process Web Data for Automatic Integration," Proceedings of the Second International Conference on Rules and Rule Markup Languages for the Semantic Web, 0/7695-2652-7/06, Jul. 2006.

Walny, Jagoda; SemaForm: Semantic Wrapper Generation for Querying Deep Web Data Sources (Interim Report).

SILA: a Spatial Instance Learning Approach for Deep Web Pages, WOODSTOCK, El Paso, Texas, 1997.

Oro, Ermelinda; Ruffolo, Massimo, "An Approach for Recognizing and Extracting Tables from PDF Documents," 2012.

Yildiz, Burcu et al., "pdf2table: A method to extract table information from PDF files," Institute of Software Technology and Interactive Systems, Vienna, Austria, 2005.

Kieninger, Thomas et al., "An approach towards benchmarking of table structure recognition results," German Research Center, 2005.

Hassan, Tamir et al, "Table and Understanding from PDF Files," Institute of Information Systems, Vienna, Austria, 2007.

Flesca, Sergio et al., "A Fuzzy Logic Approach to Wrapping PDF Documents," DEIS Department of the University of Calabria, ICAR Institute of National Research Council, Rende, Italy, 2010.

Gao, Liangcai et al, "Structure Extraction from PDF-based Booked Documents," JCDL'11, Jun. 13-17, 2011, Ottawa, Ontario, Canada.

Dejean, Herve et al., "A System for Converting PDF Documents into Structured XML Format," Xerox Research Center Europe.

Hassan, Tamir, "GraphWrap—A System for Interactive Wrapping of PDF Documents Using Graph Matching Techniques," DocEng '09, Sep. 16-18, 2009, Munich, Germany.

\* cited by examiner

OBJECT EXTRACTION FROM PRESENTATION-ORIENTED DOCUMENTS USING A SEMANTIC AND SPATIAL APPROACH

BACKGROUND

The greater part of Web contents are made available by documents which internal formats have been conceived for presenting documents on screen to human users (such as Web and PDF documents). In such documents, contents arrangement is designed to provide visual patterns that help human readers to make sense of document contents. So, a human reader is able to look at an arbitrary document and intuitively recognizing its logical structure, understand the various layout conventions and complex visual patterns that have been used in the documents presentation. This aspect is particularly evident, for instance, in deep web pages, where Web designers always arrange data records and data items with visual regularity, and in tables where the meaning of a table cell entry is most easily defined by the leftmost cell of the same row and the topmost cell of the same column (in Western languages). Documents that are conceived for presenting documents on the screen to users are referred to as presentation-oriented documents (PODs).

Approaches have been proposed to automatically access data from PODs for purposes such as automatic information extraction from web and PDF documents. Existing automatic information extraction approaches can be classified into two main groups: (i) approaches that mainly use the internal representation of deep web pages, and (ii) approaches that exploit the visual appearance of deep web pages.

Approaches based on the internal document representation depend from the HTML structure of deep web Pages. Such HTML-based approaches can be further classified as manual, semi-supervised and unsupervised. In manual approaches, a programmer finds patterns, expressed for example by XPath, from the page and then writes a program/wrapper that allows for identifying and extracting all the data records along with their data items/fields. Manual approaches are not scalable and are not usable in the current Web because of the very large number of different arrangement of data records in available deep web pages.

In supervised approaches based on HTML internal structure extraction rules are learned by using supervised machine learning algorithms from a set of manually labelled pages through a graphical user interface. Learned rules are used for extracting data records from similar pages. Such kinds of approaches still require a significant manual effort for selecting and labelling information in the training set.

Unsupervised approaches based on HTML internal structure exploit two main types of algorithms: instance and wrapper learning. Instance learning approaches exploit regularities available in deep web pages in terms of DOM structures for detecting data records and their data items. These approaches exploit unsupervised machine learning algorithms based on tree alignment techniques, hierarchical clustering, etc. Approaches falling in this category are strongly dependent from the HTML structure of deep web Pages.

In unsupervised wrapper learning approaches patterns or grammars are learned from a set of pages containing similar data records. In these approaches, pages used for generating or learning wrappers have to be found manually or by another system, then a set of heuristic rules based on highest-count tags, repeating-tags or ontology matching, etc. is used for identifying record boundaries. Furthermore many approaches falling in this category need two or more Web pages for generating the wrapper.

An analysis of many deep web pages reveals the following: (i) HTML is continuously evolving. When new versions of HTML or new tags are introduced, approaches based on previous versions have to be updated. (ii) Web designers use presentation features and spatial arrangement of data items for helping human user to identify data records. They do not take into account the complexity of underlying HTML encoding. Thus, (iii) the complexity of the source code of Web pages is ever-increasing. In fact, the final appearance of a deep web page depends from a complex combination of HTML, XML (XHTML), scripts (javaScript), XSLT, and CSS. (iv) Data records and pages are laid out either as lists or matrices where data items are indifferently organized in vertical or horizontal way. (v) The data records can be contained in non-contiguous portions of a Web page (multiple data regions). All of these aspects make it very difficult for existing approaches to learn instances and generate wrappers by using the internal encoding of Web pages and thus have strong limitations.

Visual-based approaches, such as LixTo, ViNTS, ViPERS, and ViDE, exploit some visual features of the deep web pages for defining wrappers. In LixTo, a graphical user interface showing a browser helps in manually designing the wrapper. In this case, the programmer doesn't have to write code, s/he can design the wrapper by using only mouse click on the target deep web page. The user visually selects data items and records, then the system computes HTML patterns associated to visual area selected by the user and writes a wrapper that allows for applying such patterns in similar pages. So, LixTo is essentially a supervised approach based on the HTML encoding of Web pages where examples are labelled by using a graphical user interface.

ViNTS uses visual features in order to construct wrappers that extract answers to queries on search engines. The approach detects visual regularities, i.e., content lines, in search engine answers, and then uses the HTML tag structure to combine content lines into records. ViPER incorporates visual information on a web page for identifying and extracting data records by using a global multiple sequence alignment technique. Both last two approaches are strongly dependent from the HTML structure of Web page, whereas visual information play a small role, which is a limitation. Furthermore ViPER is able to identify and extract only the main data region.

ViDE is the most recent visual-based approach. It makes use of the page segmentation algorithm ViPS. This algorithm takes in as input a web page and returns a visual block tree, i.e., a hierarchical visual segmentation of a web page in which children blocks are spatially contained in ancestor blocks. The algorithm exploits some heuristics in order to identify similar groups of blocks that constitute data records in which constituent blocks represent data items.

The ViDE approach suffers from several limitations. First, the approach strongly depends from the page segmentation algorithm ViPS, that in turn depends from the HTML encodings of Web Pages and from the set of assumptions made for segmenting Web pages. The ViPS algorithm attempts to compute a spatial representation in terms of visual blocks of a Web page by considering the document object model (DOM) structure and visual information of a Web page produced by the layout engine of a Web browser. In particular, a page segmentation algorithm strongly exploits the concept of a separator. Separators are identified, in ViPS, by heuristic rules that make use of weights experimentally set. The ViPS algorithm and the ViDE approach suffer when data records are spread in multiple data regions each contained in different page segments, and also when data records are arranged as a matrix.

An example of an existing patent related to this approach is U.S. Pat. No. 8,205,153 B2. This patent describes techniques for extracting information from formatted documents. Such techniques combine visual, mark-up, text-based, and layout-based rules for identifying information to extract form formatted documents. The method (i) makes use of geographical spatial databases typically adopted in geographical information systems, (ii) works only on web pages and not other presentation oriented formats, and (iii) does not make use of any semantic processing of document elements.

Some of the main problems that the existing approaches fail to address are: (i) the internal encoding of a POD may change frequently while the presentation remains essentially the same, and (ii) the same kind of object can be presented by using different layout conventions and presentation arrangements in different kinds of PODs.

Accordingly, it would be desirable to provide an improved method and system for automatically extracting objects from generic PODs. The method should allow a high level abstract description of objects to extract and the generation of wrappers independently from internal encodings and presentation arrangements of the PODs.

BRIEF SUMMARY

The exemplary embodiment provides methods and systems for automatic extraction of objects in a presentation-oriented document. Aspects of exemplary embodiment include receiving the presentation-oriented document (POD) in which content elements are spatially arranged in a given layout organization for presenting contents to human users; receiving a set of descriptors that semantically define the objects to extract from the POD based on attributes comprising the objects; using the set of descriptors to identify content elements in the POD that match the attributes in the set of descriptors defining the objects, and assigning semantic annotations to the identified elements based on the descriptors; creating a semantic and spatial document model (SSDM) containing spatial structures of the identified content elements in the POD and the semantic annotations assigned to the identified contents elements; extracting the identified content elements from the POD based on the set of descriptors and the SSDM to create a set of object instances; and performing at least one of: i) using the object instances to generate semantic and spatial wrappers that can be reused on a different POD, and ii) storing the object instances in a data repository.

DETAILED DESCRIPTION

Figure 1:
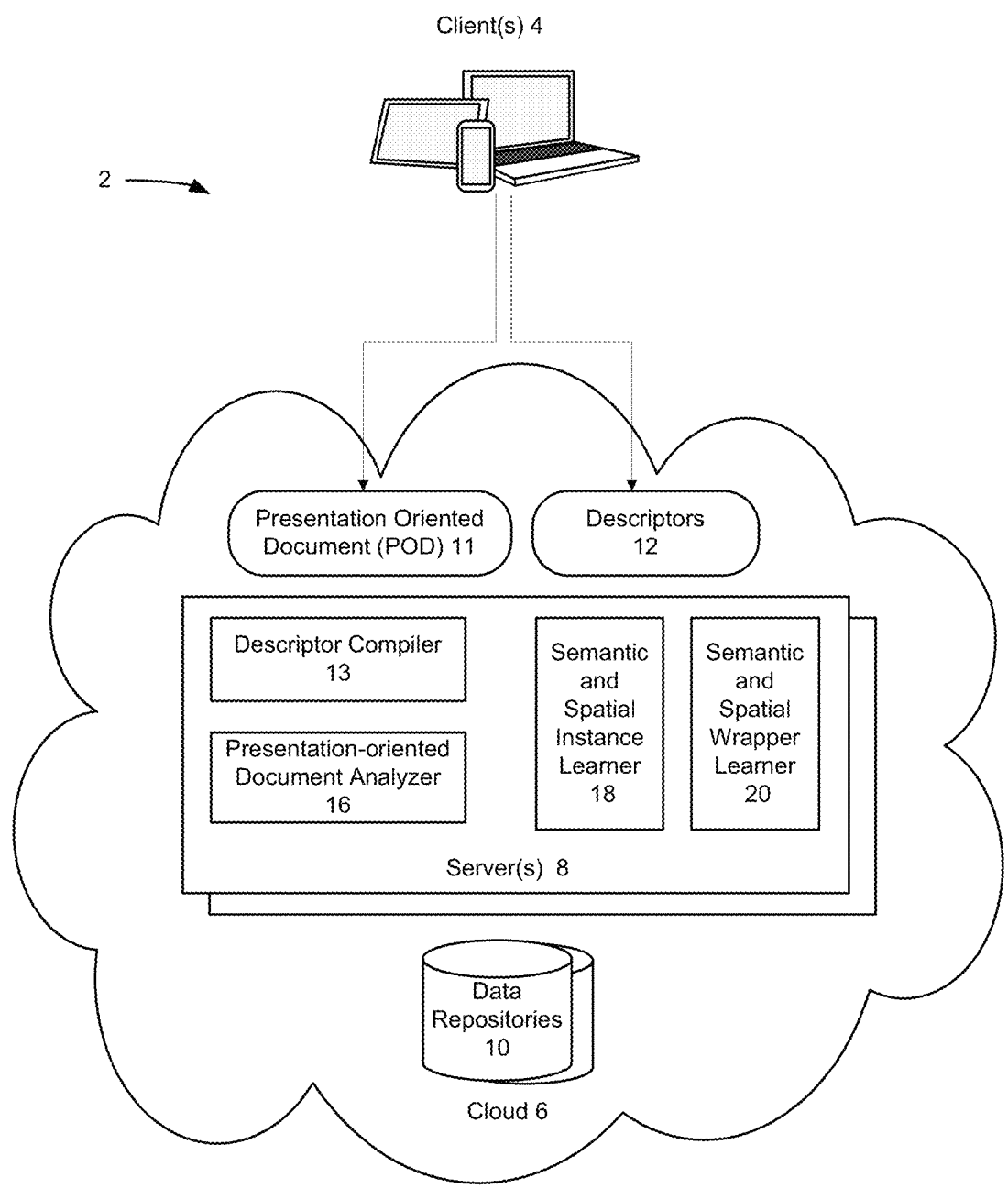
FIG. 1 is a block diagram illustrating an exemplary network system environment in which one embodiment of the present invention may be implemented for extracting object instances from a presentation oriented document.

The exemplary embodiment relates to extracting objects from presentation-oriented documents (PODs) using a semantic and spatial approach. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide methods and systems for automatically extracting object instances and generating learning wrappers from presentation-oriented documents (PODs) using a semantic and spatial approach. Aspects of the exemplary embodiment include the processing of PODs based on a set of descriptors that allow for automatically recognizing and extracting objects having a given semantic as defined by the set of descriptors.

The exemplary embodiments recognize that automatic information extraction from PODs needs to consider the semantics of laid out content elements and their mutual spatial relationships in the PODs. In fact, the tree-based structures of HTML and the flat structure of PDF language are often not convenient and sometimes even not expressive enough in order to represent the semantics and the visual relationships that are implicitly represented in the presentation layout and that indicate the meaning of document contents to the reader. In internal structures of real-world presentation-oriented documents, spatial arrangements and semantics are rarely explicit and frequently hidden in complex nesting of layout elements corresponding to intricate internal structures that are conceptually difficult to query. Conventional information extraction systems do not consider the semantics of textual contents when navigating and querying PODs for information extraction purposes.

The exemplary embodiments provide an automatic method for navigating and combining textual content elements and images, other graphics etc., contained in PODs that exploits both the spatial arrangement of content elements resulting from documents rendering as well as the semantics of the spatial content expressed in natural language. The semantics are based on descriptors that are general expressions describing the structure and the semantics of abstract objects to extract from generic PODs.

The exemplary embodiments construct domain specific wrappers by using the descriptors to express not only the visual and spatial structure of objects to recognize and extract, but also the semantics of such objects. For example, the exemplary embodiments allow a user to recognize and extract instances of photo cameras or to construct a wrapper for properties by defining simple descriptors in which are expressed as attributes of such class of object. For example, the descriptors can be used to define a photo camera as an object comprising attributes such as a number of MegaPixels for the image sensor, a zooming capability, etc. As another example, the descriptors can be used to define a real property as an object comprising attributes such as an area in square meters, a number of rooms, etc. In one embodiment, the descriptors may be created using a graphical user interface and without a need for a user to write code.

Unlike HTML-based approaches, the exemplary embodiments are completely independent from the HTML structure of the webpages because the spatial representation of webpages is based on page presentations produced by layout engines of Web browsers. Further, unlike supervised extraction approaches that need two or more Web pages for generating a wrapper, the exemplary embodiments may generate a wrapper from a single POD page.

As stated above, the ViPS algorithm and the Vi DE approach suffer when data records are spread in multiple data regions each contained in different page segments, and also when data records are arranged as a matrix. The exemplary embodiments provide an improved method that constructs a semantic and spatial document model (SSDM) of PODs by exploring presentation information returned by a layout engine (for instance of web browsers in the form of a DOM, or PDF layout engines), and acquires positions and presentation features assigned to content elements by the layout engine. Data region, records and items recognition is then performed directly on the SSDM by using a heuristic algorithm and descriptors that allow for discovering objects, such as for instance, product records spread across multiple data regions, and objects having all possible spatial arrangements.

FIG. 1 is a block diagram illustrating an exemplary network system environment in which one embodiment of the present invention may be implemented for extracting object instances from a presentation-oriented document. The system 2 will described as being implemented as a cloud-based system. However, in alternative embodiments (not shown), the system may be implemented as a client/server environment, or a desktop environment.

The system 2 may include one or more clients 4 that interact with an object extraction service operating in cloud 6, which may be designed to meet fluctuating and unpredictable business demand. In this embodiment, the object extraction service comprises software components or applications executing on one or more servers 8 in the cloud 6. In one embodiment, the applications may include a descriptor compiler 13, a presentation-oriented document analyzer 16, a semantic and spatial instance learner 18 and a semantic and spatial wrapper learner 20. The applications, data repositories 10, and other resources may be made available in cloud mode.

In one embodiment, an end user may access the applications through a web browser or by using a light-weight desktop or mobile application (not shown) executing on the client 4. In particular, the browser may connect to the applications by calling APIs exposed by the servers 8. The applications may store resulting data in one or more local or remote data repositories 10.

Different types of deployment models can be used. For instance, in public cloud applications, storage and servers may be made available to the general public by a service provider. Hybrid cloud architecture requires both on-premises resources and off-site (remote) server-based cloud infrastructure. Private cloud infrastructures may be operated solely for a single organization, whether managed internally or by a third-party, and hosted internally or externally.

According to the exemplary embodiment, a user who desires to have object instances extracted from a presentation oriented document (POD) 11, such as deep webpages and PDF documents, writes and/or loads a set of descriptors 12 that semantically describe a given set of objects to extract. The descriptors 12 may be written in a text-based language and stored in order to be reused or combined with other descriptors.

Through the web browser of the client 4, the user inputs the POD 11 and the descriptors 12 to the cloud 6. A cloud API invokes the applications running on the servers 8 for processing the POD 11 and descriptors 12, and for generating learning instances of objects, generating wrappers that extract the object instances, and finally applying the wrappers to new PODs. More specifically, the descriptor compiler 13 and the presentation-oriented document analyzer 16 pre-process the POD 11 and the descriptors 12. The semantic and spatial instances learner 18 and the semantic and spatial wrapper learner 20 then compute objects to extract from the POD 11 based on the descriptors 12 and may generate a semantic and spatial wrapper 21 (FIG. 2B) that can be subsequently accessed or queried by users. In one embodiment, the semantic spatial wrapper 21 is program that automatically identifies and extracts objects from PODs.

The servers 8 may send results to the client 4 for result visualization via a browser. The servers 8 may also make available extracted objects by a web API so that developers can obtain the extracted objects in JavaScript Object Notation (JSON), Extensible Markup Language (XML) and other formats. An API can be used to integrate the capabilities of the system 2 in external applications, such as for instance, analysis applications.

In the second embodiment (not shown), a traditional client/server computing environment could be used where the server 8 exposes the applications, where several instances of servers may be installed on different systems. In order to manage growing request and to meet load increase, a pool of servers could be used. In a traditional client/server model, the above-described process may be realized by using a traditional API or REST-services, rather than a cloud API.

In another deployment embodiment, a dispatcher (not shown) may be used to act as a gateway between client 4 and the servers 8. At boot time, each resource may first connect to a dispatcher instance and form a link to the dispatcher. The client 4 communicates to the dispatcher an instance of the type of service connect to. All communication between the dispatcher and any of the servers 8, or between any client 4 and the dispatcher, can occur on TCP/IP connections. Thus, software components can be independently distributed with in the network.

The dispatcher and architecture may be suitable for fault tolerance because it can deal with varying situations such as when one of the servers 8 fails, for a hardware problem, for instance, the failover may managed by the dispatcher, which redistributes the load to the "survivor" servers.

In a third embodiment, the system 2 can run on a single computer and the steps described above may be performed in a standalone mode. For example, the system can be installed on a desktop, notebook or tablet computer and the applications can be accessed through a graphical user interface (GUI) or API.

Although, the descriptor compiler 13, the presentation-oriented document analyzer 16, the semantic and spatial instance learner 18, and the semantic and spatial wrapper learner 20 are shown as separate applications/components, the functionality of each may be combined into a lesser or greater number of modules/components.

Both the server 8 and the client 4 may include hardware components of typical computing devices (not shown), including a processor, input devices (e.g., keyboard, pointing device, microphone for voice commands, buttons, touch-screen, etc.), and output devices (e.g., a display device, speakers, and the like). The server 8 and the client 4 may include computer-readable media, e.g., memory and storage devices (e.g., flash memory, hard drive, optical disk drive, magnetic disk drive, and the like) containing computer instructions that implement the functionality disclosed when executed by the processor. The server 8 and the client 4 may further include wired or wireless network communication interfaces for communication.

Figure 2A:
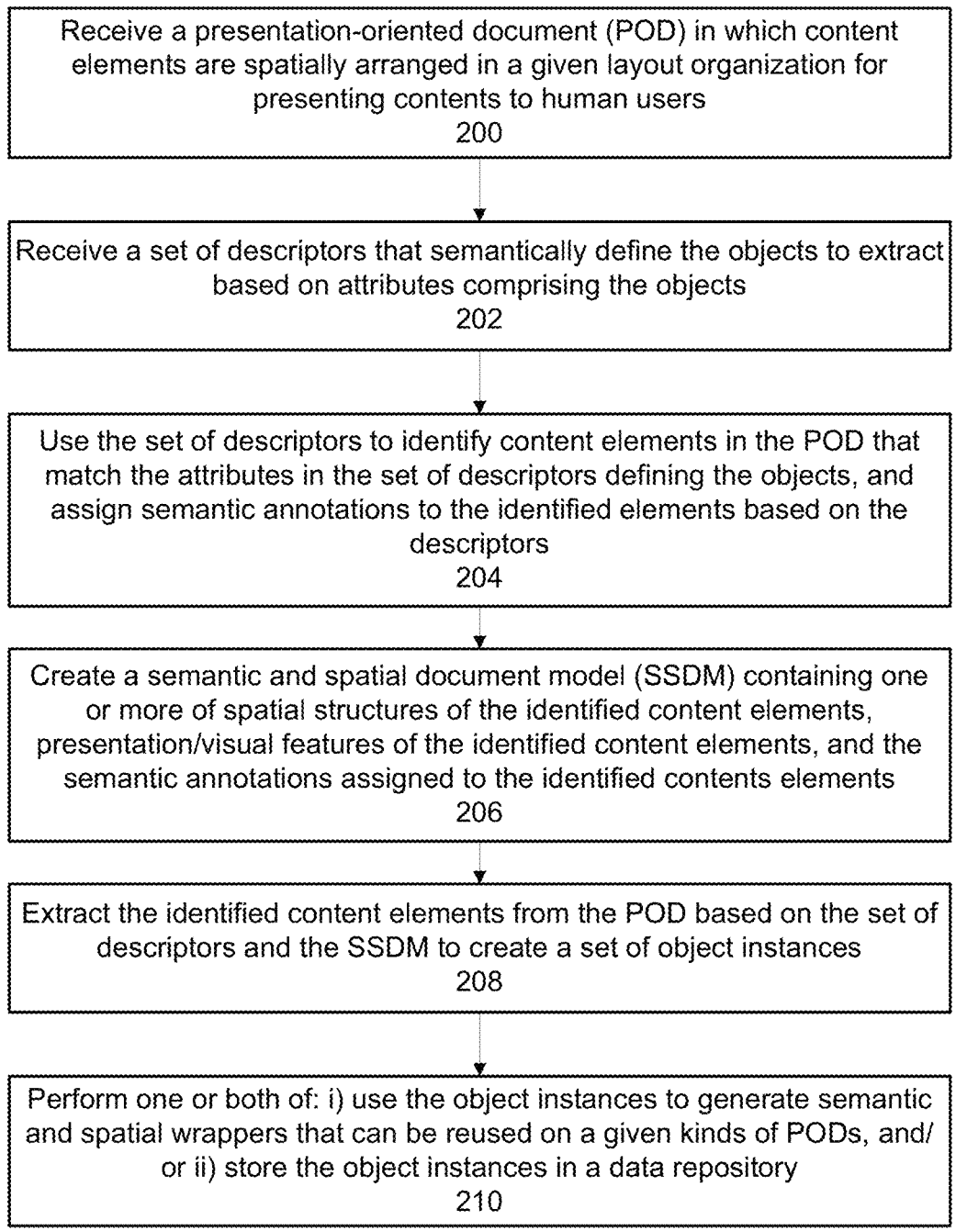
FIGS. 2A and 2B are flow diagrams illustrating the process for automatically extracting objects from a presentation-oriented document.
Figure 2B:
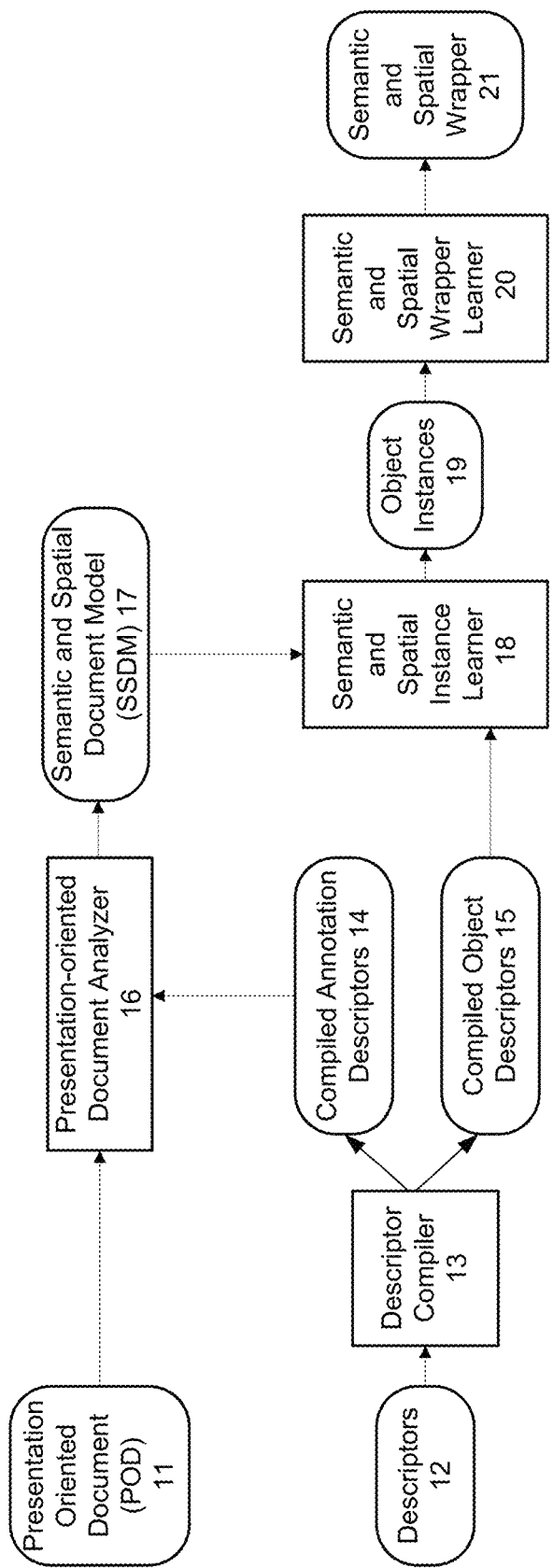

FIGS. 2A and 2B are flow diagrams illustrating the process for automatically extracting objects from a presentation-oriented document. The process may begin by the server 8 receiving the presentation-oriented document (POD) 11 in which content elements are spatially arranged in a given layout organization for presenting contents to human users (block 200). As shown in FIG. 2B, the POD 11 may be received by the presentation oriented document analyzer 16 in one embodiment.

According to one embodiment, the system 2 is capable of processing different types of presentation-oriented documents (PODs), where a POD 11 refers to a document designed to be presented to human reader. The POD 11 may have HTML, Portable Document Format (PDF), Postscript (PS) format, image file formats, presentation formats (e.g., PowerPoint™), or word processing formats (e.g., Word™) and the like. An example of HTML PODs is deep Web pages, which are parts of the Web not indexed by standard search engines.

PODs 11 typically contain a plurality of content elements spatially arranged on a page by a designer for aiding humans and making sense of the document contents, for example, by arranging shopping web pages in table format. The content elements may include text, images or other graphics. From webpages, content elements may include Document Object Model (DOM) nodes, while for PDF and word processing documents the content elements may comprise atomic pieces of information (e.g., a character, a word, a string, an image, and the like) that has all the information needed by a document viewer for rendering the document.

Referring again to FIG. 2A, the server 8 also receives as input a set of descriptors 12 that semantically define the objects to extract from the POD based on attributes comprising the objects (block 202). In one embodiment, the set of descriptors 12 define visual/spatial relationships between the objects in the POD 11 as well as semantics of the objects expressed as zero or more attributes comprising the objects. In one embodiment, the descriptors 12 may be created by a user through a graphical user interface (GUI), eliminating the need to write code.

Figure 3A:
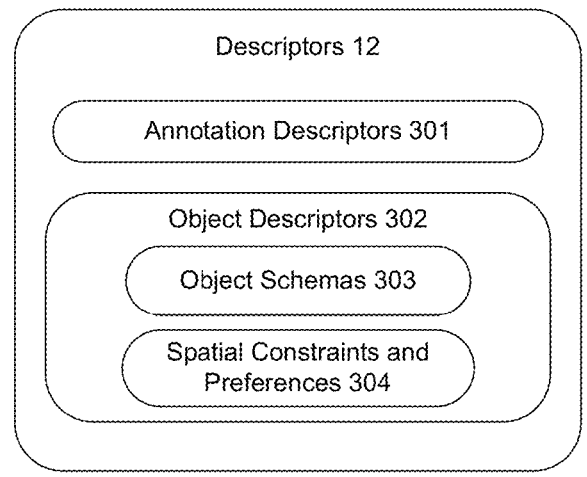
FIG. 3A is a block diagram illustrating descriptors in further detail.

FIG. 3A is a block diagram illustrating the descriptors in further detail. In one embodiment, the descriptors 12 comprise a set of declarative rules that describe the structure and the semantics of objects to extract in terms of spatial layout and attributes. In one embodiment, the descriptors 12 may be used to define classes or categories of objects using: (i) annotation descriptors 301 that define content elements found in the POD 11 in order to identify basic pieces of information that may constitute the attributes of objects to extract (e.g. a brand, a product model, a price, a technical feature); and (ii) object descriptors 302 comprising object schemas 303 that define which attributes defined by at least one of the annotation descriptors 301 and other object descriptors 302, compose each of the objects, and a set of semantic and spatial constraints and preferences 304 that define expected spatial arrangement of the attributes defined in the object descriptors 302.

In one embodiment, attributes specify properties of the objects to be found, for instance a price, a brand and megapixel of a photo-camera, or a name, an age, and a role position of a person. Attributes and objects can be recognized by exploiting semantic annotation of content elements, visual/presentation features and spatial layout, such as for a text, the attributes may specify font size, colour, and/or HTML tag. In one embodiment, the spatial constraints may specify zero or more of: distance from one attribute or element to another, direction from one attribute or element to another, alignment between elements, and conditional operators.

Examples of Descriptors

Figure 3B:
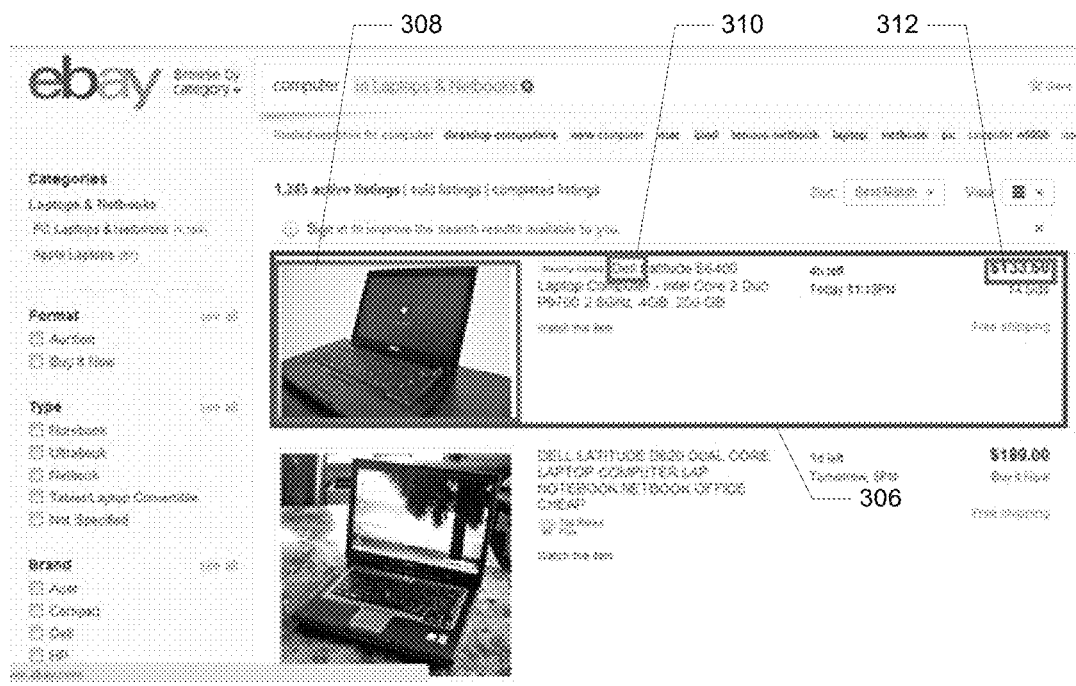
FIGS. 3B, 3C and 3D are diagrams illustrating examples of descriptors.
Figure 3C:
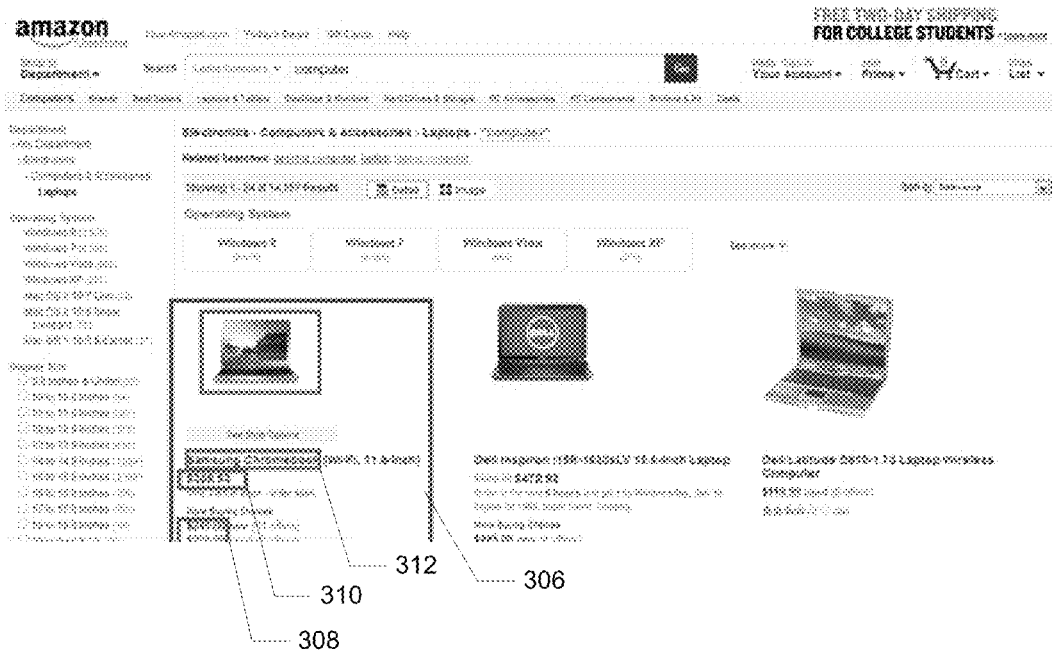

FIGS. 3B and 3C are diagrams illustrating examples of descriptors. As a first example, consider a user who wishes to use the system 2 to extract information about laptops for sale from deep web pages belonging web sites such as eBay™ and Amazon™. These two web sites are generated by different databases and present products using different internal structure and page layouts, making information extraction a challenge.

For example, as shown in FIG. 3B eBay records are internally represented by an HTML tag "table", product properties are laid out horizontally, and records are listed vertically. As shown in FIG. 3C, Amazon records are internally represented in a nested DOM structure base on HTML tag "div", product properties are arranged vertically, and records have a grid layout.

According to the exemplary embodiments, the user would use the descriptors 12 to describe a laptop object as follows:
Descriptors 1:

---
Annotation descriptors:

photo(X) <- X: image [size(X) > 5, contained(X, record_area)].
brand(X) <- X: #dictionary(laptop_brands). [DID YOU MEAN brand(Y)?]
price(X) <- (currency_symbol)? X: number [DID YOU MEAN price(Z)? IF NOT, WHAT IS "X"?]
Object descriptor:

laptop(X, Y, Z) <- X: photo, Y: brand, Z: price [photo E|S price].

---

In this example, the annotation descriptors define content elements to be recognized on a page to be found as a photo, a brand and a price. The photo is defined as an image greater than five pixels in size that is positioned within the record area. The brand is defined as any laptop brand listed in an external source (e.g., dictionaries). The price is defined as a sequence of an optional currency symbol and a number.

The object descriptor describes a laptop object as a set of three attributes: photo, brand and price. This may constitute the object schema 303 FIG. 3A. The condition [photo E|S price] may constitute the spatial constraints and preferences 304, and indicates the expected direction of the price from the photo, i.e., that the price of the laptop is expected to be on the East of (E), or on South of (S) the photo.

In the embodiment above, X, Y and Z may represent variables, and each descriptor rule is independent from each other. For instance: "brand(X)<-X:#dictionary(laptop_brands)" is a rule for recognizing dictionary instances in a POD as a brand. During processing, a string from the POD is searched for in a dictionary of laptop brands and the matching entry—the X value of the dictionary, becomes the value of the attribute "brand". The rule "laptop(X,Y,Z)", does not refer to the annotation descriptors, just to the information comprising the object descriptors.

If the annotation descriptors are too general, the system 2 may recognize attributes in the POD 11 incorrectly. However, the presentation-oriented document analyzer 16 that recognizes objects is able to disambiguate content elements by using spatial proximities, alignments, and visual similarities among semantically annotated attributes. For instance, in a given POD 11, many numbers can be individuated also when they do not represent prices of a laptop. However, the descriptor 12 defines that a number is a price of a laptop only when it is recognized close to the photo, brand and descriptions of the laptop, and is located in the same records area.

FIGS. 3A and 3B also show examples of content elements that the system will identify as a laptop object in the PODs 11 using the descriptors above. In particular, the laptop object is shown surrounded by a rectangle 306, and the attributes photo, brand, and price comprising the laptop object are shown by rectangles 308, 310 and 312.

As described below, the descriptors 12 enable the system 2 to identify a laptop in the PODs 11 independently from an inner HTML structure and the layout structure of the pages. The same approach can be used to process other types of internal format of documents, such as objects listed in a table in a PDF document, for instance.

Laptops are only examples of objects. Apartments, persons, companies, news etc. can be recognized in presentation-oriented documents by imitating human behaviour.

Figure 3D:
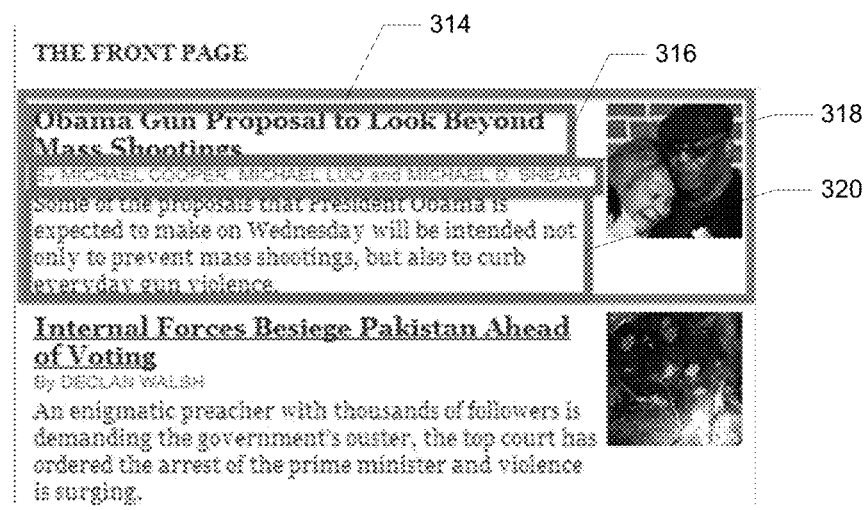

For instance, FIG. 3D illustrates an example where a set of descriptors 12 is used to recognize news objects in an electronic newspaper. A news article 314 can be described through the descriptors 12 as follows.
Descriptors 2:

---
Annotation descriptors 301 news_title(X) <- X: title [color(X) = blue].
person(X) <- X: #entity(person).
abstract(X) <- X: text_area.
Object descriptors 302 news(X, Y, Z) <- (S) X: news_title, Y: authors, Z: abstract.
authors(Y) <- (X: persons) + {Y: = Y + X}.

---

The annotation descriptors 301 may define attributes such as a news title, a person, and an abstract, where a person is defined as a sequence of an entity persons, the title is an emphasized text in a particular colour (e.g., blue), and the abstract is an arbitrary block of text. The object descriptors 302 may further define a news object 314 shown in FIG. 3D as a concatenation in south directions of a news title 316, authors 318, and an abstract and 20 located south of the news title 316, where authors 318 is further defined as a sequence of an entity persons Referring again to FIG. 2A, after the set of descriptors 12 are received, the set of descriptors 12 are used to identify content elements in the POD 11 that match the attributes in the set of descriptors that define the objects, and semantic annotations are then assigned to the identified elements based on the descriptors (block 204). A semantic and spatial document model (SSDM) may be created containing one or more of spatial structures of the identified content elements, presentation/visual features of the identified content elements, and the semantic annotations assigned to the identified contents elements (block 206). In one embodiment, the SSDM contains not only spatial structures of the identified content elements, but also general spatial relations and presentation/visual features.

Prior to using the descriptors 12 to identify content elements that match the attributes, the descriptors may first be compiled in one embodiment. As shown in FIG. 2B, the descriptors 12 may be received by the descriptor compiler 13 and compiled into a set of rules that the system 2 is able to process. More specifically, the descriptor compiler 13 may compile the descriptors 12 into a set of compiled annotation descriptors 14 and a set of compiled object descriptors 15.

The compiled annotation descriptors 14 are then input to the presentation-oriented document analyzer 16. The presentation-oriented document analyzer 16 processes the layout of the POD 11 and applies the set of compiled annotation descriptors to the POD 11 to identify the matching content elements, which are output in the SSDM 17. Parts or regions of the POD 11 may be split and the content elements may be annotated semantically. For example a particular identified content element may be annotated as being a "brand" of a laptop object. Accordingly, a fine-grained annotation of the content elements in the POD 11 may be obtained. Therefore, the SSDM 17 combines both the spatial arrangement of the identified content elements of the POD 11 with the fine-grained semantic annotation of the identified content elements.

According to one exemplary embodiment, the SSDM 17 may be represented as a graph in which the nodes of the graph represent the identified content elements along with their semantic annotations assigned by applying the content elements annotation descriptors 301. Edges in the graph connecting the nodes represent spatial relationships between the connected nodes. In one embodiment, the annotation for each node may specify the semantic category to which the node belongs. For example, a number can be annotated as being a number of the currency.

By using the compiled annotation descriptors 14, the presentation oriented document analyzer 16 is able to process not only web pages, but also Postscript, PDF, and word processing documents. According to the exemplary embodiments, the presentation-oriented document analyzer 16 is able to locate and identify content elements within data records that are contained in multiple data regions and/or in different page segments, or when data records are arranged in a matrix. Further details of the presentation-oriented document analyzer 16 are provided with respect to FIG. 4.

Referring again to FIG. 2A, the set of descriptors 12 and the SSDM 17 are used to extract the identified content elements from the POD 11 to create a set of object instances 19 (block 208). Referring again to FIG. 2B, this step may be implemented in one embodiment by inputting the set of descriptors 12 and the SSDM 17 to the semantic and spatial instance learner 18, which produces the object instances 15.

In one embodiment, the semantic and spatial instance learner 18 applies the compiled object descriptors 15 to the SSDM 17 in order to discover the spatial organization of the content elements in the POD 11 that together represent the objects to extract. The semantic and spatial instance learner 18 searches for content elements that compose a given object as defined by the object descriptors 302. If the object descriptors described for example a laptop computer, as brand, megabytes of memory and gigabytes of a hard disk, and a given type of display, the semantic and spatial instance learner 18 tries to discover objects having the specified layout of attributes. This is a discovery process based on semantics of the content, the spatial layout, and the presentation features of the content elements.

The output of the semantic and spatial instance learner 18 is the set of object instances 19. In one embodiment, the set of object instances 19 represents the set of extracted objects. For example, the object instances 19 may be a set of objects organized as records, such as laptops, from the POD 11 that are represented by vertical or horizontal records (e.g., a photo, a brand, and a price).

Referring again to FIG. 2A, as a last step the system 2 may perform one or both of the following: i) use the object instances 19 to generate semantic and spatial wrappers that can be reused on a different POD, and/or ii) store the object instances 19 in at least one of the data repositories 6 (block 210).

Referring to FIG. 2B, in one embodiment, the object instances 19 are input to the semantic and spatial wrapper learner 20, which automatically generates a semantic and spatial wrapper 21 for the specific POD 11. The semantic and spatial wrapper 21 represents a type of object, for example a laptop, which can be recognized in other PODs that are visually and semantically described in the same way.

In another embodiment, the object instances 19 and/or the semantic and spatial wrapper 21 may be stored in the data repositories 10 shown in FIG. 1. Additional details of regarding the processing of the applications shown in FIG. 2B are provided below.

Figure 4:
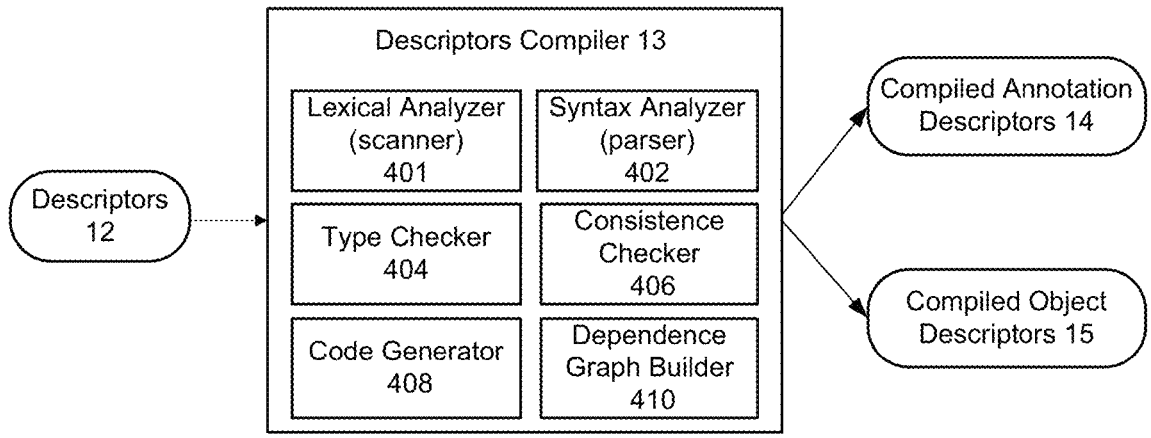
FIG. 4 is a block diagram illustrating components of the descriptors compiler.

FIG. 4 is a block diagram illustrating the components of the descriptors compiler 13. The descriptors compiler 13 receives as input the set of descriptors 12 that describe in an abstract and declarative fashion objects to extract by declaring both the semantics of objects to extract and their structure in terms of attributes, spatial layout and visual features. The descriptors compiler 13 outputs the compiled annotation descriptors 14 and the compiled object descriptors 15, which may be used as rules for automatically recognizing objects contained in PODs.

In one embodiment, the descriptors compiler 13 comprises a lexical analyzer 401, a syntax analyzer 402, a type checker 404, a consistency checker 406, a code generator 408, and a dependency graph builder 410. The lexical analyzer 401 is a scanner that reads the descriptors 12, while the syntax analyzer 402 is a syntax parser that scans tokens of the language of the descriptors and determines if the syntax of descriptors 12 is written correctly, e.g., that a descriptor comprises a name of an object and a set of one or more attributes that describe the object. The type checker 404 determines that all components are computable by other descriptors or by built-in functions. The consistency checker 406 determines that objects and attributes in the descriptors are bounded and validated. The code generator 408 generates the compiled annotation descriptors 14 and the compiled object descriptors 15.

The dependency graph builder 410 creates a graph of the dependences among the compiled descriptors 14. For instance, the object descriptor for laptops in Descriptor 1, depends from the annotation descriptor for brands that depends in turn from the built-in dictionary. A dependency graph is useful to manage cycles among descriptors and optimize the annotation and object recognition processes. For instance, in order to recognize laptops (objects) a bottom-up process may be performed. Firstly, annotation descriptors are recognized that describe basic pieces of content such as dictionaries, regular expressions, and built-in functions (e.g., for querying presentation features); then attributes (e.g., brand) are recognized by combining basic pieces of content; and finally objects are recognized by using object descriptors that combine lower level annotation descriptors. Dependency graphs can be used for selecting only those descriptors needed for recognizing a given objects type (for instance, the object descriptors for laptop needs only annotation descriptors for photo, brand, and price that can be selected among many others annotation descriptors useful for recognizing other objects).

Figure 5:
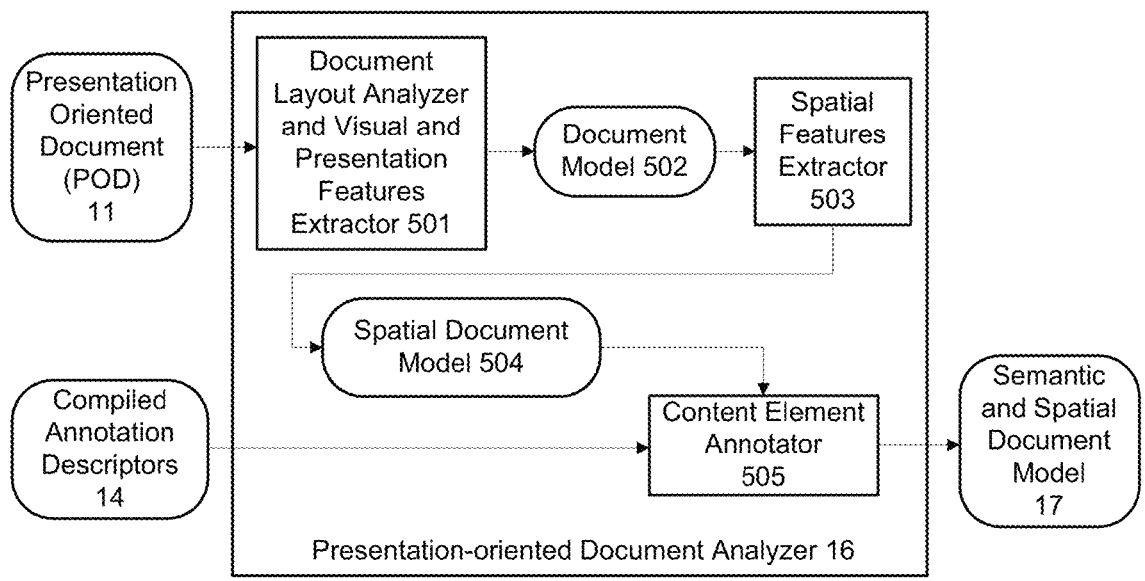
FIG. 5 is a block diagram illustrating in further detail the process performed by the presentation-oriented document analyzer according to an exemplary embodiment.

FIG. 5 is a block diagram illustrating in further detail the process performed by the presentation-oriented document analyzer 16 according to an exemplary embodiment. The presentation-oriented document (POD) analyzer 16 receives as input one or more PODs and a set of compiled annotation descriptors 14. The POD analyzer 16 generates a structured representation of the POD in which a subset of the content elements in the POD are recognized as attributes as defined by the compiled annotation descriptors 14 and annotated or labelled as such. The set of annotated content elements may be output in the form of the semantic and spatial document model (SSDM) 17.

The POD analyzer 16 may include a document layout analyzer and visual presentation feature extractor 501, a spatial feature extractor 503, and a content element analyzer 505. The document layout analyzer and visual presentation feature extractor 501 reads and analyzes PODs and may use a visualizer (e.g., a layout engine of a web browser) to automatically extract content elements (e.g., blocks of text, images, other graphics) from PODs. For each content element, a layout analyzer extracts the area of the screen in which the content element is visualized, while a visual presentation feature extractor extracts presentation features that express how each content element is displayed to the human readers (e.g., font colour, size, type, style, etc.). The document layout analyzer and visual presentation feature extractor 501 may output a document model 502 that for each content element represents the area in which it is visualized and the presentation features assigned by the layout engine.

The spatial feature extractor 503 receives the document model 502 and extracts spatial features for each element and between elements. In particular, in an exemplary embodiment, visualization areas of content elements are rearranged so that: (i) each area associated to a content element corresponds to the minimum bounding box that surrounds the content element and (ii) spatial relations between content elements are computed. For instance, for each attribute belonging to an object, the area of the attribute is contained in the visualization area of the whole object. Spatial relations among elements may be explicitly represented in the output model. For instance, relation South between an image and its caption can be represented in the graph as a labelled arc between the image and its caption. So, in an exemplary embodiment the spatial feature extractor 503 may output a spatial document model 504.

The content element analyzer 505 receives the spatial document model 504 and annotates semantically content elements, in the input model, by matching compiled annotation descriptors to the content elements, and then outputs the spatial and semantic document model (SSDM) 12.

The output of the POD analyzer 16 is the semantic and spatial document model (SSDM) 12, which may be used to recognize objects instances and the wrappers. The contents of the SSDM 17 are described in FIG. 6.

Figure 6:
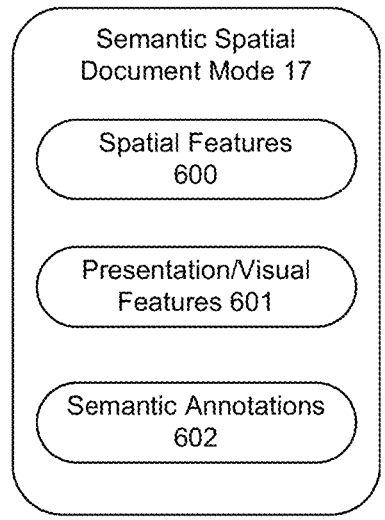
FIG. 6 is a block diagram illustrating further details of the semantic and spatial document model (SSDM).

FIG. 6 is a block diagram illustrating further details of the semantic and spatial document model (SSDM). The SSDM 17 is a document model that represents both the spatial structure of content elements and their assigned semantic annotations.

In this embodiment, each content element in the SSDM 17 may be associated with spatial features 600, presentation/visual features 601 and semantic annotation 602. The spatial features 600 may store the spatial relations among content elements; the presentation/visual features 601 may store the minimum bounding rectangles and visual features of the content elements; and the semantic annotation 602 may store the assigned annotations.

The SSDM 17 is an internal representation of the POD that constitutes a unified representation of the content elements laid out in the POD. In one exemplary embodiment, the SSDM 17 may be represented as a graph in which vertices are content elements of PODs augmented with associated minimum bounding rectangles and visual features of the content elements, and the semantic annotation 602.

Edges linking the nodes in the graph may represent hierarchy relations (e.g. a cell is contained in its table) and spatial relations (e.g., a title is on top of the section content) between connected content element nodes. Each vertex of the SSDM 17 may include: (i) coordinates assigned to the rectangle that surround the content element, (ii) semantic annotations obtained by applying descriptors to the textual content of DOM nodes or PDF content elements, and (iii) presentation/visual features.

In an alternative embodiment, the spatial features 600, the presentation/visual features 601 and the semantic annotation 602 assigned to the identified content elements may be represented using other types of data structures, such as Hash mapping, R-tree, or making spatial relations computable on demand, rather than a graph.

Figure 7:
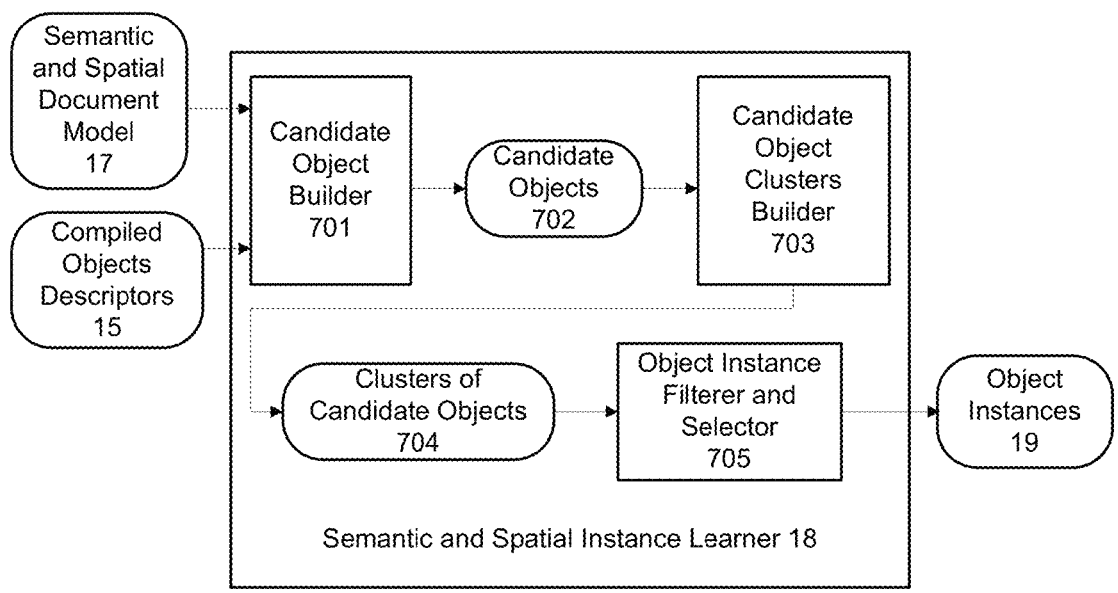
FIG. 7 is a block diagram illustrating further details regarding the process performed by the semantic and spatial instance learner.

FIG. 7 is a block diagram illustrating further details regarding the process performed for the semantic and spatial instance learner 18. The semantic and spatial instance learner 18 receives as input the SSDM 17 and the compiled object descriptors 15 comprising object descriptors that define types of objects to be recognized as a set of attributes and spatial constraints and preferences. The semantic and spatial instance learner 18 identifies object instances to extract by searching for annotated content elements in the SSDM 17 that compose given objects as defined by the compiled object descriptors 15.

In one embodiment, the semantic and spatial instance learner 18 may comprise a candidate object builder 701, a candidate object clusters builder 703, and an object instance filterer and selector 705. In one embodiment, the compiled object descriptors 15 are used by the candidate object builder 701, the candidate object clusters builder 703, and the object instance filterer and selector 705.

The candidate object builder 701 attempts to find candidate object instances 702 to extract by searching the SSDM 17 for all possible combinations of annotated content elements/attributes corresponding to a particular object descriptor. For instance, assume the compiled object descriptors 15 define a photo camera as a specific set of attributes—brand, name & price. The candidate object builder 701 would search sets of tuples in the SSDM 17 and recognizes similar sets of content elements to create the candidate object instances 702. The candidate objects 702 may not be complete and may have errors.

The candidate object clusters builder 703 narrows the results and reduces these errors by grouping the candidate object instances 702 by presentation and spatial similarity to create clusters of candidate objects 704. For example, an alignment of elements in each row of a table may be used to recognize records.

The object instances filterer and selector 705 may: (i) generate the object instances 19 by filtering the clusters of candidate objects 704 based on the spatial constraints and preferences expressed by the compiled object descriptors 15 or by general filtering rules (e.g., records in deep web pages do not overlap each other); (ii) select and annotate new attributes (not already annotated content elements) and generate new objects instances by using similarities with already recognized object instances. The object instances 19 represent a set of objects of the specific types described by the compiled object descriptors 15 and recognized in a POD such as a webpage, PDF, or other type of document.

Figure 8:
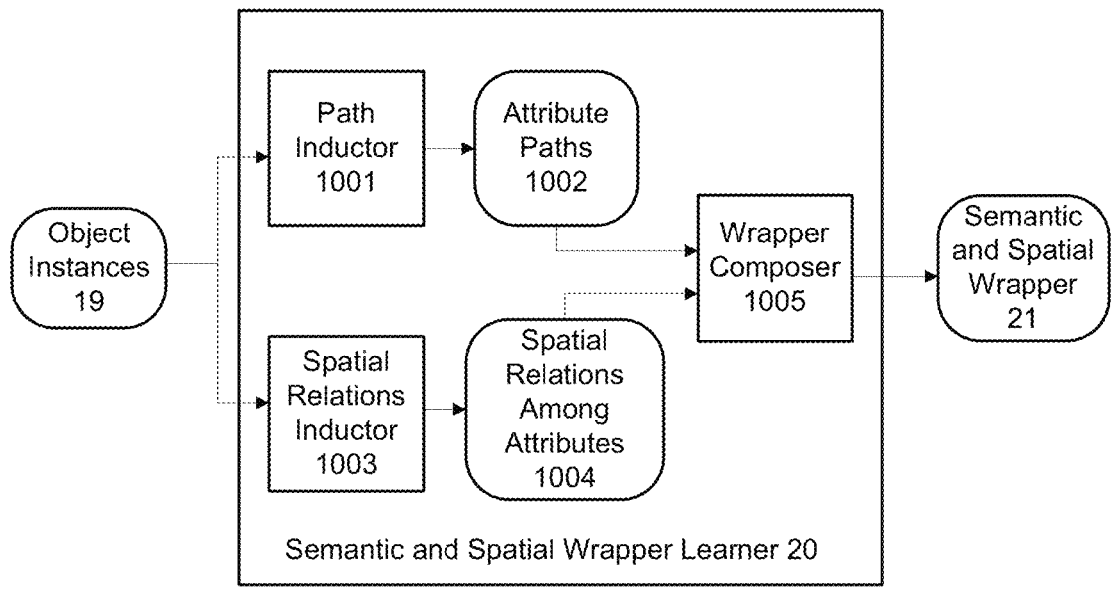
FIG. 8 is a block diagram illustrating further details of an exemplary semantic and spatial wrapper learner.

FIG. 8 is a block diagram illustrating further details of an exemplary semantic and spatial wrapper learner 20. In one embodiment, components of the semantic and spatial wrapper learner 20 may include a path inductor 1001, a spatial relations inductor 1003, and a wrapper composer 1005.

The path inductor 1001 may receive as input the learned object instances 19, and for each object attribute induces a general pattern that represents the object attribute in the SSDM 17. In an exemplary embodiment, starting from a set of attributes of the same type belonging to different object instances of the same type, the pattern inductor computes which is the generalized path, in the graph of the SSDM 17, which represents all attributes of the same type for all object instances. The output of the path inductor 1001 may be a set of general paths 1002 that identify annotated vertices of the graph that represent attributes of the object instances The spatial relations inductor 1003 may receive as input the learned object instances 19, and by considering spatial relations among attributes of object instances computes generalized spatial relations, between each pairs of attributes, that are valid for each object instance. The spatial relations inductor 1003 may output a set of general spatial relations among attributes 1004.

The wrapper composer 1005 may receive as input the set of general attribute paths 1002 generated by the path inductor 1001, and the set of generalized spatial relations among attributes 1004 valid for each of the object instances. The wrapper composer 1005 composes elements in the input by collecting for each of the attribute of an object type the attribute path and the set of spatial relations existing between the given attribute and other attributes of the object, and the wrapper composer 1005 outputs the semantic and spatial wrapper 21 of the object.

The semantic and spatial wrapper 21 comprises a set of attribute paths in the SSDM 17 and a set of spatial relations between pairs of attributes in the SSDM 17. In one embodiment, the spatial wrapper 21 may be represented as a graph where each node is accompanied by an attribute path, and edges represent spatial relations among nodes, but other representations are also possible (e.g., a visualization area pattern where a typical visual and semantic configuration of an object is represented).

Figure 9:
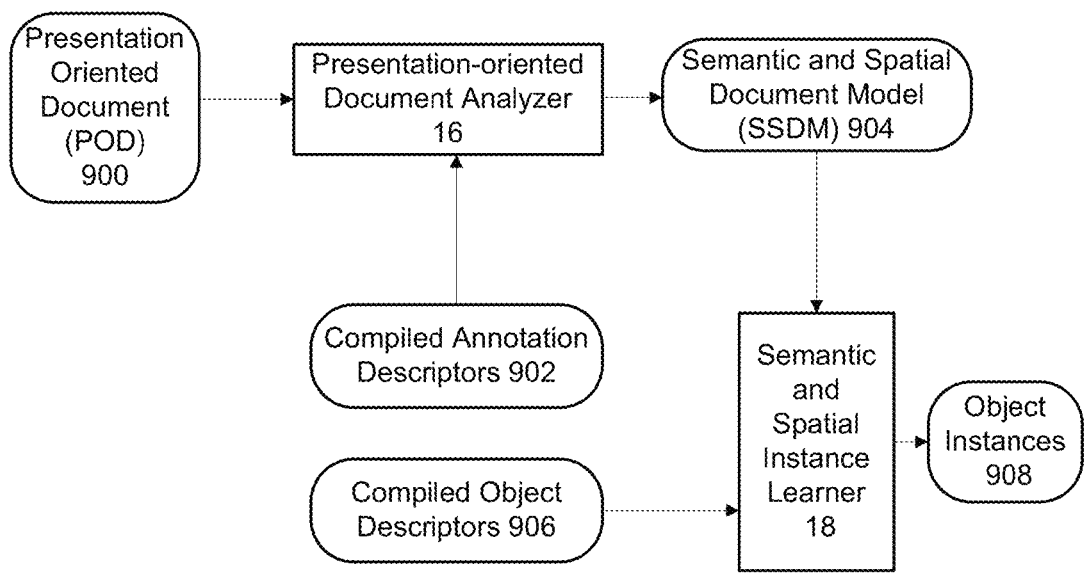
FIG. 9 is a block diagram illustrating a process that is similar to the process shown in FIG. 2B, but in which the object instances are stored after creation by the semantic and spatial instance learner.

FIG. 9 is a block diagram illustrating a process that is similar to the process shown in FIG. 2B, but in which the object instances 19 are stored after creation by the semantic and spatial instance learner 18. Input to the system may include a POD 11, a set of compiled annotation descriptors 14 and a set of compiled object descriptors 15. For each page of POD 900, the POD analyzer 16 applies compiled annotation descriptors 902 to generate a semantic spatial document model (SSDM) 904. The semantic and spatial instance learner 18 applies compiled object descriptors 906 to the SSDM 17 in order to identify object instances 908 to extract. The object instances 908 may be provided in output in a standard format that allows for storing extracted instances in any kind of database or data repository.

Figure 10:
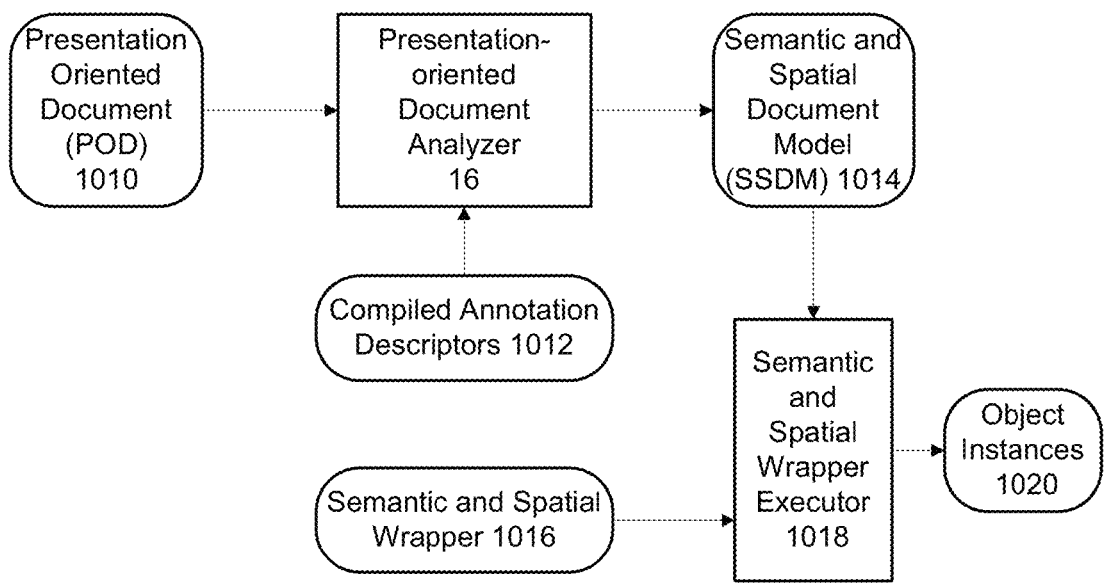
FIG. 10 is a block diagram illustrating an example of object instances extraction by using wrappers generated by the system.

FIG. 10 is a block diagram illustrating an example of object instances extraction by using wrappers generated by the system. In this embodiment, the system receives as input a POD 1010, and a set of compiled annotation descriptors 1012, and the POD analyzer 16 generates the SSDM 1014. A semantic and spatial wrapper executor 1018 receive as input the SSDM 1014 and a semantic and spatial wrapper 1016, and applies the semantic and spatial wrapper 1016 to the SSDM 1014 to provide as output a set of object instances 1020 extracted by applying the semantic and spatial wrapper 1006. The extracted object instances 1020 may then be stored in any kind of database or data repository.

Embodiments for automatically extracting objects from a presentation-oriented document using a semantic and spatial approach have been disclosed. The processing of the system of the exemplary embodiments is different from existing approaches because while prior approaches may utilize a spatial component to identify objects, the exemplary embodiments use both a semantic and a spatial approach. The conventional VIDE approach, for example, is not a semantic-based approach, just syntactic and structural approach.

In addition, the exemplary embodiments utilize a spatial approach that is different to prior approaches. That is, the semantic and spatial document model (SSDM) 17 is an original internal representation in which each content element of the POD may include: (i) presentation/visual features 601 including a minimum bounding rectangle that corresponds to the visualization area assigned to each of the content elements by the document visualizer; (ii) the semantic annotation 602 assigned by the content element annotator 505; and (iii) spatial relations 600 among content elements.

For example, a shopping webpage that has an image followed horizontally by a blue hyperlink of the name of the product could be defined by the descriptor "picture EAST blue_link", which describes the direction that the URL is laid out on the page in relation to the image. The picture and the URL are both nodes in the graph, EAST in the edge that connects the two nodes. In this way, all spatial relations can be expressed that are present between all nodes of the document page. Algorithms may be used that are able to navigate the semantic spatial document model 17 to automatically to discover sub-graphs represented in the records.

The exemplary embodiments also do not use a segmentation approach that needs to segment a page to learn the records. The exemplary embodiments apply algorithms directly on the semantic and spatial document model 17 to identify minimum boundary rectangle that contains all and only attributes that compose a given record.

The system of the exemplary embodiments is more abstract than conventional approach because the system uses semantics, but also more general because the system uses a SSDM capable of unifying different kinds of PODs. Current approaches are incapable of extracting information from PDF documents in addition to HTML and other type of documents.

The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A method for automatically extracting objects in a presentation-oriented document, comprising:
   receiving as input by a computer the presentation-oriented document (POD) and a set of descriptors, the POD comprising content elements spatially arranged in a given layout organization for presenting contents to human users, wherein the computer is configured to process PODs having different formats, including webpage formats and Portable Document Format (PDF) formats, and wherein the set of descriptors define the objects to extract from the POD by defining both spatial relationships between the objects in the POD as well as semantics of the objects expressed as zero more attributes comprising the objects;
   using the set of descriptors to identify content elements in the POD that match the attributes in the set of descriptors defining the objects, and assigning semantic annotations to the identified content elements based on the descriptors;
   creating a semantic and spatial document model (SSDM) containing one or more of spatial structures of the identified content elements, presentation/visual features of the identified content elements, and the semantic annotations assigned to the identified contents elements;

extracting the identified content elements from the POD based on the set of descriptors and the SSDM to create a set of object instances; and performing at least one of: i) using the object instances to generate semantic and spatial wrappers that can be reused on a different POD, and ii) storing the object instances in a data repository.

2. The method of claim 1 wherein the set of descriptors comprise:

annotation descriptors that annotate content elements found in the POD in order to identify basic pieces of information that constitute the attributes of the objects to extract; and object descriptors comprising object schemas that define which attributes defined by at least one of the annotation descriptors and other object descriptors, compose each of the objects to extract, and a set of semantic and spatial constraints and preferences that define expected spatial arrangement of the attributes defined in the object descriptors.

3. The method of claim 1, wherein receiving the set of descriptors further comprises: compiling the set of descriptors into a set of compiled annotation descriptors and compiled object descriptors.

4. The method of claim 3, wherein using the set of descriptors to identify content elements in the POD further comprises: applying the set of compiled annotation descriptors to the POD to create the SSDM.

5. The method of claim 3, wherein creating the SSDM further comprises:

using a visualizer to automatically extract visual presentation features from the POD to create a document model;

using the document model and the visualizer to extract spatial features from the POD and to create a spatial document model, where each of the extracted spatial features expresses a visualization area assigned by the visualizer; and analyzing the spatial document model based on the attributes defined by the descriptors to semantically annotate the content elements in the spatial document model according to attribute rules.

6. The method of claim 1, further comprising: representing the SSDM as at least one of a graph, hash mapping, and an R-tree.

7. The method of claim 1, wherein the descriptors are created through a graphical user interface.

8. The method of claim 2, further comprising: creating object instances by searching for annotated content elements in the SSDM that compose given objects as defined by the object descriptors.

9. An executable software product stored on a non-transitory computer-readable storage medium containing program instructions for automatically extracting objects from a presentation-oriented document, the program instructions for:

receiving as input by a computer the presentation-oriented document (POD) and a set of descriptors, the POD comprising content elements are spatially arranged in a given layout organization for presenting contents to human users, wherein the computer is configured to process PODs having different formats, including webpage formats and Portable Document Format (PDF) formats, and wherein the set of descriptors that define the objects to extract from the POD by defining both spatial relationships between objects in the POD as well as semantics of the objects expressed as zero more attributes comprising the objects;

using the set of descriptors to identify content elements in the POD that match the attributes in the set of descriptors defining the objects, and assigning semantic annotations to the identified content elements based on the descriptors;

creating a semantic and spatial document model (SSDM) containing one or more of spatial structures of the identified content elements, presentation/visual features of the identified content elements, and the semantic annotations assigned to the identified contents elements;

extracting the identified content elements from the POD based on the set of descriptors and the SSDM to create a set of object instances;

performing at least one of: i) using the object instances to generate semantic and spatial wrappers that can be reused on a different POD, and ii) storing the object instances in a data repository.

10. The executable software product of claim 9 wherein the set of descriptors comprise:

annotation descriptors that annotate content elements found in the POD in order to identify basic pieces of information that constitute the attributes of the objects to extract; and object descriptors comprising object schemas that define which attributes defined by at least one of the annotation descriptors and other object descriptors, compose each of the objects to extract, and a set of semantic and spatial constraints and preferences that define expected spatial arrangement of the attributes defined in the object descriptors.

11. The executable software product of claim 9, wherein receiving the set of descriptors further comprises program instructions for: compiling the set of descriptors into a set of compiled annotation descriptors and compiled object descriptors.

12. The executable software product of claim 11, wherein using the set of descriptors to identify content elements in the POD further comprises program instructions for: applying the set of compiled annotation descriptors to the POD to create the SSDM.

13. The executable software product of claim 11, wherein creating the SSDM further comprises program instructions for:

using a visualizer to automatically extract visual presentation features from the POD to create a document model;

using the document model and the visualizer to extract spatial features from the POD and to create a spatial document model, where each of the extracted spatial features expresses a visualization area assigned by the visualizer; and analyzing the spatial document model based on the attributes defined by the descriptors to semantically annotate the content elements in the spatial document model according to attribute rules.

14. The executable software product of claim 9, further comprising program instructions for: representing the SSDM as at least one of a graph, hash mapping, and an R-tree.

15. The executable software product of claim 10, further comprising program instructions for: creating object instances by searching for annotated content elements in the SSDM that compose given objects as defined by the object descriptors.

16. A system, comprising:

a memory;

a processor coupled to the memory; and one or more software components executed by the processor that is configured to:

receive as input the presentation-oriented document (POD) and a set of descriptors, the POD comprising content elements are spatially arranged in a given layout organization for presenting contents to human users, wherein the processor is configured to process PODs having different formats, including webpage formats and Portable Document Format (PDF) formats, and wherein the set of descriptors that define the objects to extract from the POD by defining both spatial relationships between objects in the POD as well as semantics of the objects expressed as zero more attributes comprising the objects;

use the set of descriptors to identify content elements in the POD that match the attributes in the set of descriptors defining the objects, and assign semantic annotations to the identified content elements based on the descriptors;

create a semantic and spatial document model (SSDM) containing one or more of spatial structures of the identified content elements, presentation/visual features of the identified content elements, and the semantic annotations assigned to the identified contents elements;

extract the identified content elements from the POD based on the set of descriptors and the SSDM to create a set of object instances; and perform at least one of: i) using the object instances to generate semantic and spatial wrappers that can be reused on a different POD, and ii) storing the object instances in a data repository.

17. The system of claim 16 wherein the set of descriptors comprise:

annotation descriptors that annotate content elements found in the POD in order to identify basic pieces of information that constitute the attributes of the objects to extract; and object descriptors comprising object schemas that define which attributes defined by at least one of the annotation descriptors and other object descriptors, compose each of the objects to extract, and a set of semantic and spatial constraints and preferences that define expected spatial arrangement of the attributes defined in the object descriptors.

18. The system of claim 16, wherein the set of descriptors are compiled into a set of compiled annotation descriptors and compiled object descriptors.

19. The system of claim 18, wherein the set of compiled annotation descriptors are applied to the POD to create the SSDM.

20. The system of claim 18, wherein one or more software components create the SSDM by:

using a visualizer to automatically extract visual presentation features from the POD to create a document model;

using the document model and the visualizer to extract spatial features from the POD and to create a spatial document model, where each of the extracted spatial features expresses a visualization area assigned by the visualizer; and analyzing the spatial document model based on the attributes defined by the descriptors to semantically annotate the content elements in the spatial document model according to attribute rules.

21. The system of claim 16, wherein the SSDM is represented as at least one of a graph, hash mapping, and an R-tree.

22. The system of claim 17, wherein the object instances are created by searching for annotated content elements in the SSDM that compose given objects as defined by the object descriptors.

* * * * *